UNITED STATES PATENT OFFICE 2,095,856

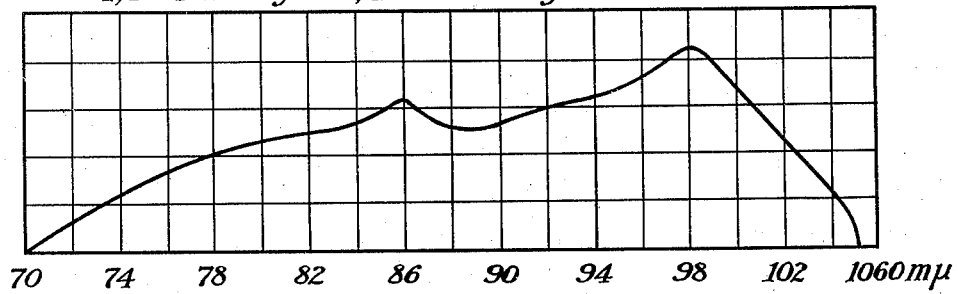

PHOTOGRAPHIC EMULSION CONTAINING 4,4'-TRICARBOCYANINE DYES

Leslie G. S. Brooker, Rochester, N. Y., assignor, by mesne assignments, to Eastman Kodak Company, Jersey City, N. J., a corporation of New Jersey Original application January 16, 1933, Serial No. 652,029. Divided and this application April 24, 1935, Serial No. 17,999

8 Claims. (Cl. 95—7)

This invention relates to photographic emulsions containing cyanine dyes and more particularly to gelatino-silver-halide emulsions containing 4,4'-tricarbocyanine dyes comprising two similar quinoline nuclei linked through their gamma positions by a seven-methenyl chain.

This application is a division of my copending application Serial No. 652,029, filed January 16, 1933.

Certain tricarbocyanine dyes have been suggested for the sensitizing of gelatino-silver-halide emulsions to the red portion of the spectrum. Now, I have found that 4,4'-tricarbocyanine dyes sensitize gelatino-halide emulsions to the deep red portion of the spectrum. In fact, I have found that the sensitizing activity of these dyes is most pronounced in the infra-red region. Dyes sensitizing photographic emulsions to such wave lengths have heretofore been unknown.

The object of this invention, therefore, is to provide gelatino-silver-halide emulsions containing 4,4'-tricarbocyanine dyes. A further object is to provide gelatino-silver-halide emulsions sensitized with 4,4'-tricarbocyanine dyes. Other objects will appear hereinafter.

4,4'-tricarbocyanine dyes can be prepared as described in my copending application Serial No. 651,870, filed January 16, 1933. In this copending application, the preparation of dyes of the following general structure is described:

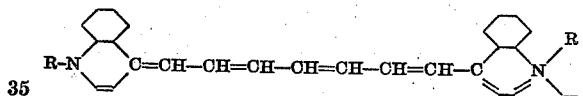

wherein R represents an alkyl group and wherein X represents an acid radical. Such dyes are prepared by condensing two molecular proportions of a quinoline alkyl quaternary salt, having a reactive methyl group in the gamma position, such as lepidine ethiodide or lepidine alliodide, with one molecular proportion of a condensation product of glutaconic aldehyde and a primary or secondary amine, such as glutaconic aldehyde dianilide, preferably employed in the form of its hydrochloride, in the presence of a strong organic base, such as triethylamine or piperidine. The quinoline alkyl quaternary salts, having a reactive methyl group in the gamma position, (the so-called lepidine alkyl quaternary salts) may or may not be substituted in the nucleus by groups such as methyl or ethoxy or the like.

The following examples, taken from my copending application Serial No. 651,870, serve to illustrate the method of preparation of the dyes formulated above.

*Example 1.—1,1'-Diethyl-4,4'-tricarbocyanine iodide*

12 parts (2 mols.) of lepidine ethiodide were dissolved in 25 parts of absolute ethyl alcohol and the solution chilled in a freezing mixture with stirring, so as to obtain very small crystals of the quaternary salt. 5.6 parts (1 mol.) of glutaconic aldehyde dianilide hydrochloride were then added, the mixture stirred, and then 3.4 parts (2 mols.) of piperidine added, with cooling and shaking. A dark coloration rapidly developed and the whole was stood aside in the ice box overnight. Next morning the muddy liquors were filtered off, the residue washed with acetone until most of the tarry impurities had disappeared, followed by water and then more acetone. The residue was next boiled with a small quantity of methyl alcohol, cooled and filtered, and this treatment repeated once or twice until the filtrate was a clear green color and the dye on the filter looked clear. It then consisted of coppery crystals and gave a somewhat dull green solution. The dye could be successfully recrystallized from methyl alcohol, especially if the hot liquors were chilled so as to expose the dye to the action of the hot alcohol for as short a time as possible. Triethylamine can be substituted for piperidine.

*Example 2.—1,1'-Dimethyl-4,4'-tricarbocyanine iodide*

11.4 parts (2 mols.) of lepidine methiodide were treated as in Example 1. The dye obtained was recrystallized from methyl alcohol and obtained as a dark brown crystalline powder. The color of its methyl alcohol solution was olive green.

*Example 3.—1,1'-Diallyl-4,4'-tricarbocyanine iodide*

12.8 parts (2 mols.) of lepidine alliodide were treated as in Example 1. The dye was obtained as beautiful reddish coppery crystals.

The preparation of all of the dyes of the 4,4'-tricarbocyanine class can be effected as illustrated in the above examples. Minor variations in the method which might be required for an individual dye will be apparent to those skilled in the art.

The diagrammatic spectrogram constituting the accompanying drawing illustrates the regions of the spectrum to which the 4,4'-tricarbocyanine dyes will sensitize a gelatino-silver-halide emulsion and the extent or degree of sensitization at various wave lengths. The figure of this drawing and the dye, the sensitizing properties of which it illustrates, is as follows:

1,1'-Dimethyl-4,4'-tricarbocyanine iodide

The sensitization resulting from all of the dyes belonging to the 4,4'-tricarbocyanine class is comparable to the sensitization illustrated as resulting from the specific dye named in connection with this figure. For example, the sensitization resulting from 1,1'-diethyl-4,4'-tricarbocyanine iodide is practically identical with that shown for 1,1'-dimethyl-4,4'-tricarbocyanine iodide.

The preparation of gelatino-silver-halide emulsions are well known to those skilled in the art. To sensitize such emulsions, I prepare a stock solution of the dye by dissolving the dye in alcohol. Then in one liter of the emulsion I thoroughly incorporate, normally, a volume of the stock solution which contains from approximately ⅕ to about one milligram of the dye and spread the emulsion upon a suitable support, such as glass or cellulose derivative sheeting, to a suitable thickness and allow it to dry. Photographic elements so prepared are best stored in the cold and at all stages in the handling and mixing of the dye solution or emulsion containing it, the temperature should be kept as low as possible without jelling the emulsion. This is due to the inherent instability of these dyes at elevated temperatures.

The amount of dye which is actually incorporated in a given quantity of emulsion will, of course, vary from dye to dye and emulsion to emulsion, as is known to those skilled in the art. The above figures are, therefore, to be regarded only as illustrative as it may be necessary in some cases to use more or less of the dye, than I have above indicated.

Under the class of gelatino-silver-halide emulsions, I, of course, include all of the silver halides customarily employed in the art, but more particularly the silver chloride and silver bromide emulsions.

What I claim as my invention and desire to be secured by Letters Patent of the United States is:

1. A gelatino-silver-halide emulsion sensitized with a 4,4'-tricarbocyanine salt.

2. A gelatino-silver-halide emulsion sensitized with a tricarbocyanine dye of the following structure:

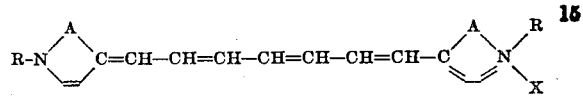

wherein A represents a phenylene group, R represents an alkyl group and X represents an acid radical.

3. A gelatino-silver-halide emulsion sensitized with a 1,1'-dialkyl-4,4'-tricarbocyanine salt.

4. A gelatino-silver-halide emulsion sensitized with a 1,1'-dialkyl-4,4'-tricarbocyanine iodide.

5. A gelatino-silver-halide emulsion sensitized with 1,1'-dimethyl-4,4'-tricarbocyanine iodide.

6. A gelatino-silver-halide emulsion sensitized with 1,1'-diethyl-4,4'-tricarbocyanine iodide.

7. A gelatino-silver-halide emulsion sensitized with 1,1'-diallyl-4,4'-tricarbocyanine iodide.

8. A photographic element comprising a supporting surface coated with a gelatino-silver-halide emulsion sensitized with a 4,4'-tricarbocyanine salt.

LESLIE G. S. BROOKER.